(12) United States Patent
Kitabatake et al.

(10) Patent No.: US 11,008,984 B2
(45) Date of Patent: May 18, 2021

(54) MOTOR VEHICLE ON WHICH A VEHICLE ENGINE IS MOUNTED

(71) Applicant: MAZDA MOTOR CORPORATION, Hiroshima (JP)

(72) Inventors: Keishi Kitabatake, Hiroshima (JP); Taku Kuramashi, Hatsukaichi (JP); Tamotsu Takamure, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/641,196

(22) PCT Filed: Aug. 1, 2018

(86) PCT No.: PCT/JP2018/028902
§ 371 (c)(1),
(2) Date: Feb. 21, 2020

(87) PCT Pub. No.: WO2019/039218
PCT Pub. Date: Feb. 28, 2019

(65) Prior Publication Data
US 2021/0010445 A1   Jan. 14, 2021

(30) Foreign Application Priority Data

Aug. 24, 2017 (JP) .............................. JP2017-161497

(51) Int. Cl.
*F02M 26/35* (2016.01)
*F02M 26/09* (2016.01)
(Continued)

(52) U.S. Cl.
CPC ............ *F02M 26/35* (2016.02); *F02M 26/09* (2016.02); *F02M 26/12* (2016.02); *F02M 26/13* (2016.02);
(Continued)

(58) Field of Classification Search
CPC ........ F02M 26/09; F02M 26/12; F02M 26/13; F02M 26/14; F02M 26/15; F02M 26/41; F01N 2340/04
See application file for complete search history.

(56) References Cited

U.S. PATENT DOCUMENTS 6,722,126 B2 *  4/2004  Kawamizu ............ F01N 3/2892
                                                  60/324
8,549,837 B2 * 10/2013  Ushijima ............ F01N 13/1816
                                                  60/282
(Continued)

FOREIGN PATENT DOCUMENTS

EP      1 422 411 A2     5/2004
EP      1422411 A2 *    5/2004  ............. F02M 26/12
(Continued)

OTHER PUBLICATIONS

International Search Report issued in PCT/JP2018/028902; dated Oct. 2, 2018.

*Primary Examiner* — Kevin R Steckbauer
(74) *Attorney, Agent, or Firm* — Studebaker & Brackett PC

(57) ABSTRACT

A motor vehicle (100) on which a vehicle engine (1) is mounted is described, the vehicle engine (1) including: an exhaust purification system (70) housing a GPF device (73) for purifying exhaust gas; and an EGR passage (52) connected to a portion of the exhaust purification system located downstream of the GPF device, and the engine is mounted in an engine compartment (R) defined in a front portion of a vehicle body. The exhaust purification system is located forward of a dash panel (103) constituting the engine compartment, and is positioned to extend toward a tunnel portion (T) of the dash panel. An upstream end portion (52*c*)

(Continued)

of the EGR passage is connected to a lower portion of the exhaust purification system in a vertical direction of the vehicle.

9 Claims, 13 Drawing Sheets

(51) Int. Cl.
    *F02M 26/12*     (2016.01)
    *F02M 26/13*     (2016.01)
    *F02M 26/15*     (2016.01)
    *F02M 26/41*     (2016.01)
    *F02M 26/14*     (2016.01)
    *F02M 26/23*     (2016.01)
    *F02M 26/16*     (2016.01)

(52) U.S. Cl.
    CPC ............ *F02M 26/14* (2016.02); *F02M 26/15* (2016.02); *F02M 26/41* (2016.02); *F01N 2340/04* (2013.01); *F02M 26/16* (2016.02); *F02M 26/23* (2016.02)

(56) References Cited

U.S. PATENT DOCUMENTS

| | | | | |
|---|---|---|---|---|
| 9,488,091 | B2 * | 11/2016 | Kuramashi | F01N 3/2892 |
| 9,611,777 | B2 * | 4/2017 | Kato | F01N 3/2066 |
| 10,280,825 | B2 * | 5/2019 | Kuramashi | F01N 13/107 |
| 10,385,756 | B2 * | 8/2019 | Kuramashi | F01N 3/10 |
| 10,422,270 | B2 * | 9/2019 | Tanno | B62D 25/082 |
| 10,526,950 | B2 * | 1/2020 | Torizuka | B60K 13/04 |
| 10,746,080 | B2 * | 8/2020 | Nakahira | B60K 5/04 |
| 10,835,865 | B2 * | 11/2020 | Kuramashi | F01N 3/021 |
| 2003/0131594 | A1 * | 7/2003 | Kawamizu | F01N 13/10 |
| | | | | 60/299 |
| 2011/0126521 | A1 * | 6/2011 | Ushijima | F01N 13/1822 |
| | | | | 60/282 |
| 2011/0126522 | A1 * | 6/2011 | Ushijima | B60K 13/04 |
| | | | | 60/282 |
| 2015/0252716 | A1 * | 9/2015 | Tanno | F01N 13/14 |
| | | | | 123/41.58 |
| 2016/0084139 | A1 * | 3/2016 | Kato | F01N 13/10 |
| | | | | 60/323 |
| 2017/0260891 | A1 * | 9/2017 | Kuramashi | F01N 3/101 |
| 2017/0342890 | A1 * | 11/2017 | Torizuka | B60K 13/04 |
| 2019/0063299 | A1 * | 2/2019 | Kitabatake | F01N 13/10 |
| 2019/0366268 | A1 * | 12/2019 | Kuramashi | F01N 3/10 |
| 2021/0010445 | A1 * | 1/2021 | Kitabatake | F01N 3/10 |

FOREIGN PATENT DOCUMENTS

| | | |
|---|---|---|
| JP | 2003-206783 A | 7/2003 |
| JP | 2006070712 A | 3/2006 |
| JP | 2011196211 A | 10/2011 |
| JP | 2012057519 A | 3/2012 |
| JP | 2016217249 A | 12/2016 |

* cited by examiner

MOTOR VEHICLE ON WHICH A VEHICLE ENGINE IS MOUNTED

TECHNICAL FIELD

The present disclosure relates to a motor vehicle on which a vehicle engine is mounted.

BACKGROUND ART

Patent Document 1 discloses, as an example of a vehicle engine, an engine including a purification unit (three-way catalyst) that purifies exhaust gas, and an EGR passage (EGR passage) that branches off from a portion of an exhaust passage downstream of the purification unit to be connected to an intake passage.

In the engine configured in this manner, burned gas returns to the intake passage after passing through the purification unit, and thus, a deposit component in external EGR gas can be reduced.

CITATION LIST

Patent Document

Patent Document 1: Japanese Unexamined Patent Publication No. 2016-217249

SUMMARY OF THE INVENTION

Technical Problem

When the engine described in Patent Document 1 is mounted in a front portion of a vehicle body, at least part of its exhaust passage is located at a rear portion of the engine compartment. In this case, if the engine is a rear exhaust engine, in particular, the purification unit connected to the exhaust passage is also located at the rear portion of the engine compartment.

On the other hand, as described above, the EGR passage branches off from the exhaust passage downstream of the purification unit. Thus, an upstream end portion of the EGR passage becomes close to the rear end of the engine compartment because the purification unit is located at the rear portion of the engine compartment. Therefore, the upstream end portion becomes close to a vehicle structure including a partition wall (e.g., a dash panel) that serves as a rear surface of the engine compartment, in particular, a tunnel portion of the partition wall.

In recent years, when an elaboration is made to the configuration of the engine to downsize the engine, for example, the EGR passage is required to be positioned as far as possible from the vehicle structure.

In view of the foregoing background, an object of the present disclosure is to provide a vehicle engine which is downsized and in which an EGR passage and a vehicle structure are positioned apart from each other.

Solution to the Problem

The present disclosure relates to a motor vehicle on which a vehicle engine is mounted, the vehicle engine including: an exhaust purifier housing a purification unit that purifies exhaust gas; and an EGR passage connected to a portion of the exhaust purifier located downstream of the purification unit, the vehicle engine being mounted in an engine compartment defined in a front portion of a vehicle body.

The exhaust purifier is positioned forward of a partition wall in a longitudinal direction of a vehicle, and extends toward a tunnel portion extending rearward from the partition wall in the longitudinal direction of the vehicle, the partition wall defining a rear portion of the engine compartment, and an upstream end portion of the EGR passage is connected to a lower portion of the exhaust purifier in a vertical direction of the vehicle.

According to this configuration, the exhaust purifier that houses the purification unit is positioned in front of the tunnel portion of the partition wall, which is a vehicle structure, to extend toward the tunnel portion, without being inserted into the tunnel portion. Therefore, compared to the configuration in which the exhaust purifier is inserted into the tunnel portion, the dimension of the engine in the longitudinal direction of the vehicle can be shortened, and by extension, the engine can be downsized.

The tunnel portion is generally formed by a ceiling surface that projects upward. Then, connecting the EGR passage to the lower portion of the exhaust purifier as described above can further block the upstream end portion of the EGR passage from approaching the ceiling surface as compared to the case where the EGR passage is connected to an upper portion of the exhaust purifier, for example.

This can downsize the engine, and can position the EGR passage and the vehicle structure apart from each other.

The partition wall may have an inclined portion inclined downward toward a rear side in the longitudinal direction of the vehicle. The upstream end portion of the EGR passage may be connected to a rear end portion of the exhaust purifier in the longitudinal direction of the vehicle. The upstream end portion of the EGR passage may be positioned below an upper end of the inclined portion in a vehicle height direction when viewed from the side of the vehicle.

According to this configuration, the upstream end portion of the EGR passage can be positioned in front of the inclined portion. Taking the rearward inclination of the inclined portion into account, the upstream end portion of the EGR passage can be positioned apart from the partition wall in accordance with the inclination angle.

The upstream end portion of the EGR passage may be positioned to overlap with the tunnel portion when viewed from the front side or rear side of the vehicle.

According to this configuration, if the engine is moved immediately behind upon collision of the vehicle, for example, the upstream end portion of the EGR passage goes back to fit in the tunnel portion.

Further, the exhaust purifier may be provided with a delivering portion to which the upstream end portion of the EGR passage is connected, and the delivering portion may be configured to project outward in a vehicle width direction.

This configuration advantageously makes the delivering portion apart from the partition wall, and by extension, an inner wall surface of the tunnel portion.

Specifically, for example, if the delivering portion projects upward in the vehicle height direction, the delivering portion becomes close to the ceiling surface described above, i.e., projects in a direction toward the partition wall, which is disadvantageous.

On the other hand, if the delivering portion projects downward in the vehicle height direction, the delivering portion is spaced apart from the partition wall, and also from the ceiling surface. In this case, however, moisture contained in the burned gas is accumulated at the lower end of the delivering portion. This configuration is also disadvantageous because the moisture may contain components that cause corrosion of metals.

The delivering portion can be configured to project rearward in the longitudinal direction of the vehicle. However, this configuration may bring the delivering portion closer to the partition wall. In addition, the distance between the delivering portion and the EGR passage increases in the longitudinal direction of the vehicle, which is disadvantageous also from the viewpoint of the downsizing of the engine.

In another configuration, the delivering portion can be configured to project forward in the longitudinal direction of the vehicle. However, this configuration may increase the curvature of a passage from the casing to the delivering portion, depending on the shape of the casing in which the purification unit is housed. This may be disadvantageous from the viewpoint of reduction of a flow path resistance.

Therefore, as described above, the delivering portion, projecting outward in the vehicle width direction, can be blocked from approaching the partition wall without causing the aforementioned disadvantages. This is advantageous in securing a wide space between the delivering portion and the partition wall.

The delivering portion may project opposite in the vehicle width direction to a passage portion of the exhaust purifier positioned upstream from the purification unit, and the passage portion and the delivering portion may be both configured to guide gas from one side toward the other side in the vehicle width direction.

According to this configuration, the gas can be guided more smoothly from the passage portion to the delivering portion, as compared to the configuration in which the delivering portion and the passage portion are both disposed on the right side. This can reduce the deterioration of the flow path resistance as much as possible, while keeping the delivering portion and the partition wall apart from each other.

Further, the exhaust purifier may be connected to a cylinder head via an exhaust manifold. The exhaust manifold may include branch passages, each of which is connected to an associated one of cylinders through an exhaust port of the cylinder head, and a meeting portion at which the branch passages meet together to be connected to the exhaust purifier. The meeting portion may be located on one side in a cylinder bank direction of the branch passages, and extends downward on the one side. The exhaust purifier may be positioned on the other side in the cylinder bank direction relative to a lower end portion of the meeting portion.

According to this configuration, the exhaust purifier positioned toward the other side in the cylinder bank direction can ensure a space on the one side in the cylinder bank direction. This is advantageous in keeping the exhaust purifier apart from the vehicle structure including the partition wall.

Advantages of the Invention

As can be seen, according to the motor vehicle on which a vehicle engine is mounted described above, the EGR passage and the vehicle structure can be positioned apart from each other.

DESCRIPTION OF EMBODIMENTS

Figure 1:
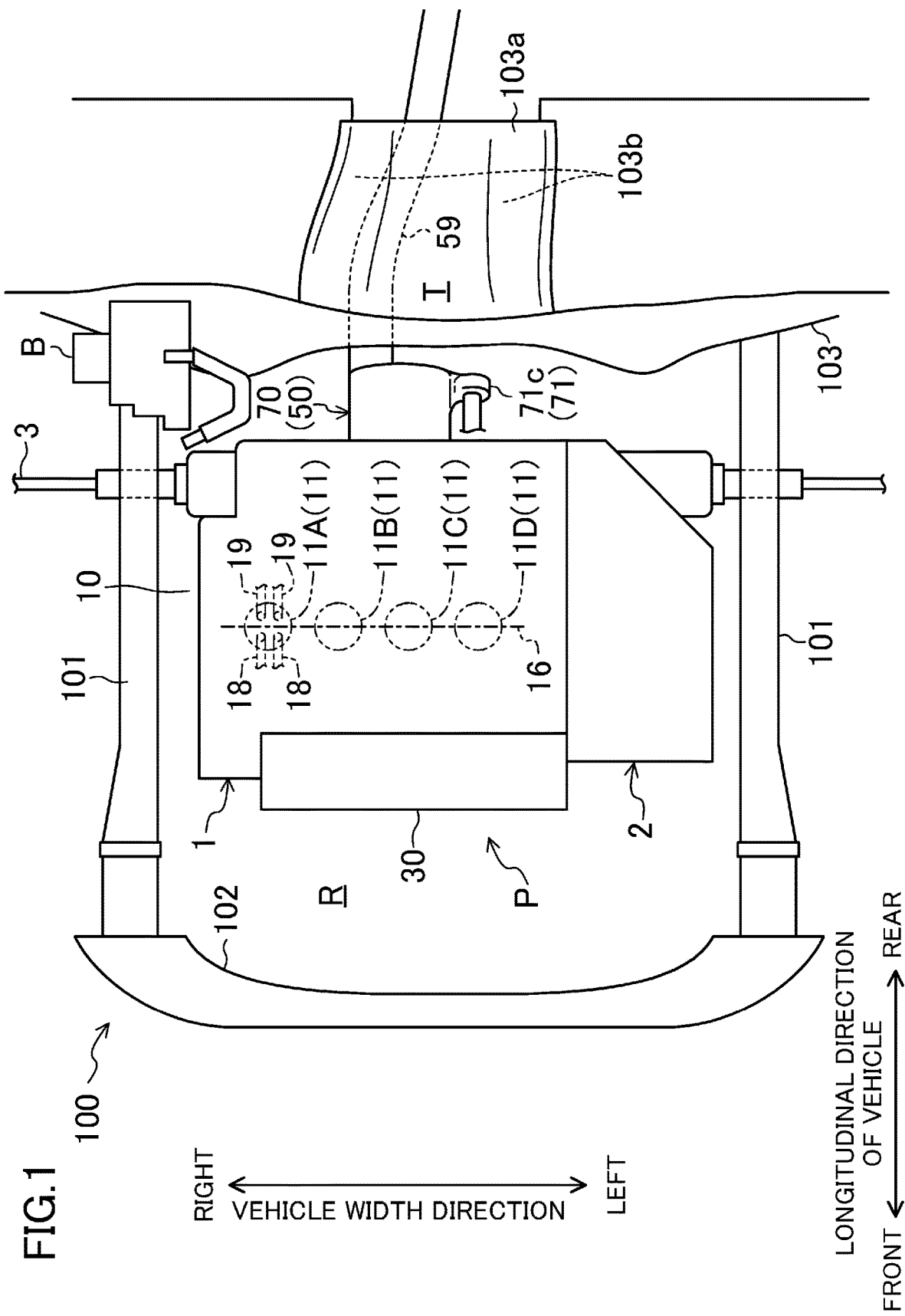
FIG. 1 is a schematic diagram illustrating a vehicle on which a power train unit is mounted.
Figure 2:
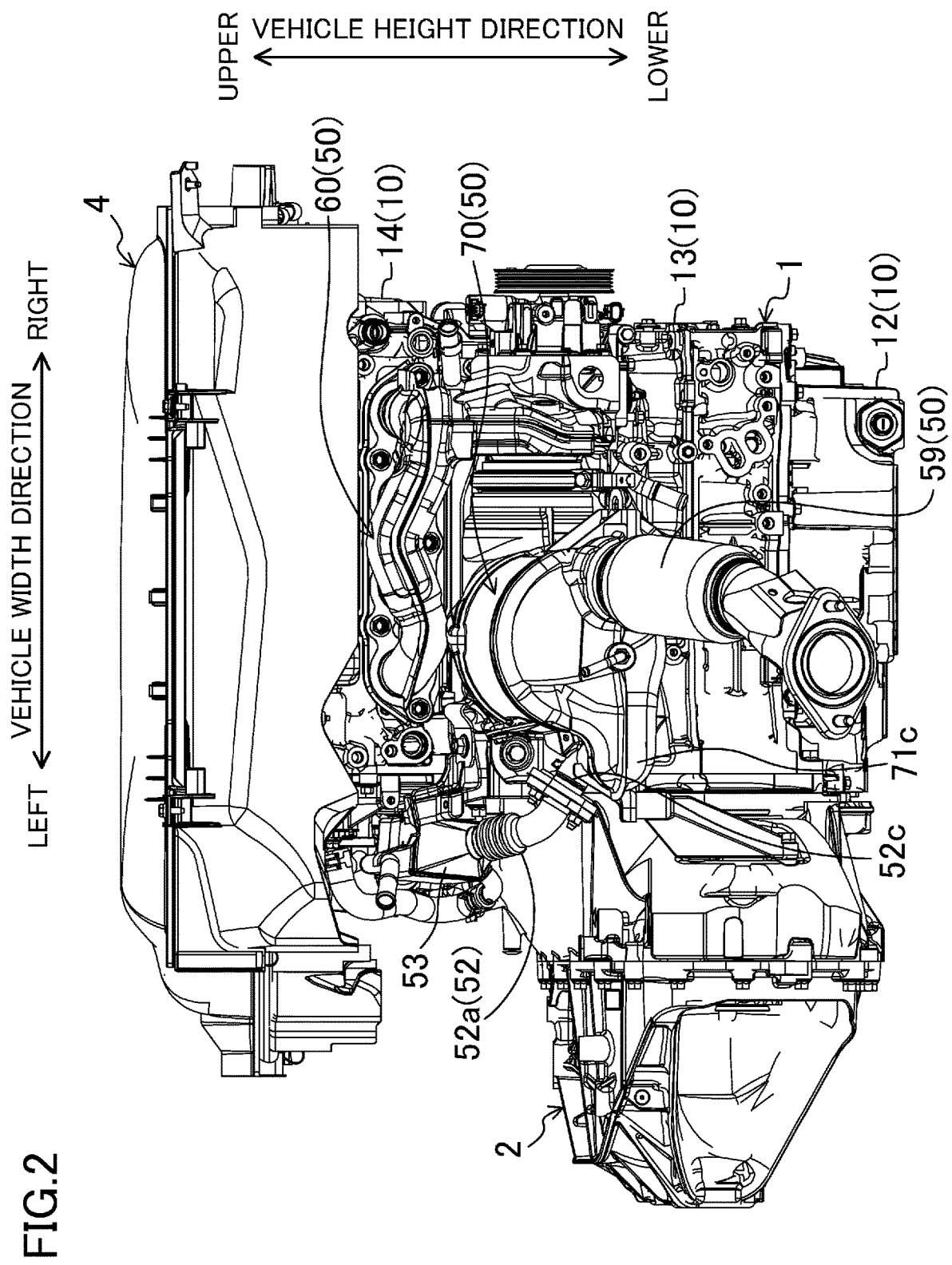
FIG. 2 illustrates the power train unit as viewed from behind.
Figure 3:
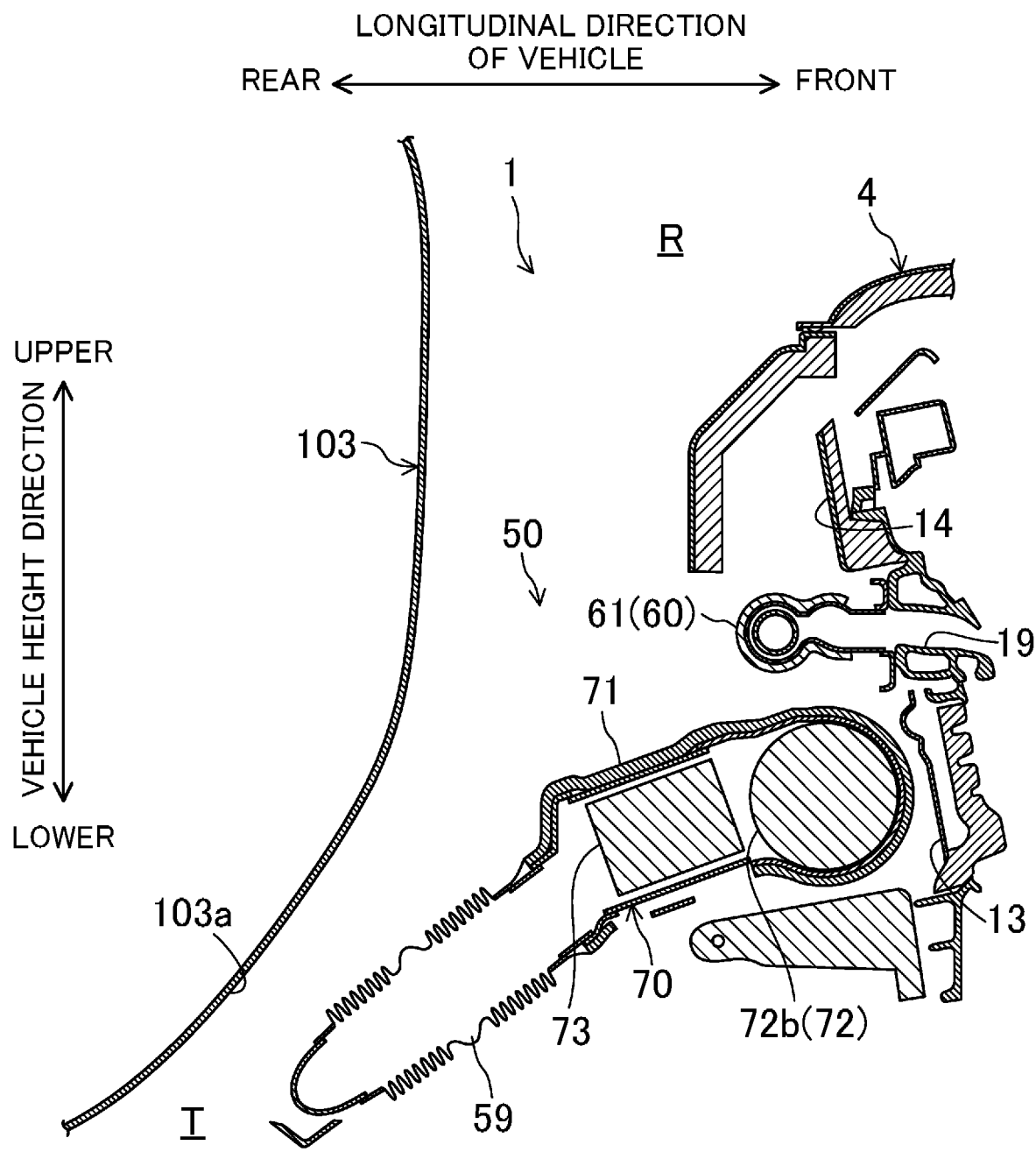
FIG. 3 is a vertical cross-sectional view illustrating a configuration of an exhaust passage.

Embodiments of a motor vehicle on which a vehicle engine is mounted will be described in detail with reference to the drawings. The following description is only an example. FIG. 1 is a diagram showing a front portion of a motor vehicle (vehicle) 100 on which a power train unit P to which a vehicle exhaust system disclosed herein is applied is mounted. FIG. 2 is a diagram showing the power train unit P as viewed from behind, and FIG. 3 is a vertical cross-sectional view showing the configuration of an exhaust passage 50.

(Schematic Configuration of Power Train Unit)

First, a schematic configuration of the power train unit P will be described.

The power train unit P includes an engine 1, and a transmission 2 connected to the engine 1. The engine 1 is a four-stroke gasoline engine, and is configured to be able to execute both of spark ignition combustion and compression ignition combustion. The transmission 2 is configured as a manual transmission, for example, and transmits the output of the engine 1 to drive a drive shaft 3 to rotate.

The motor vehicle 100, on which the power train unit P is mounted, is configured as a front-engine, front-drive four-wheel vehicle. That is, the power train unit P, the drive shaft 3, and driving wheels (i.e., front wheels) connected to the drive shaft 3 are positioned in a front portion of the motor vehicle 100. The motor vehicle 100 is configured as a so-called right-hand drive vehicle, and is provided with a driver's seat on the right side in a vehicle width direction.

A vehicle body of the motor vehicle 100 includes a plurality of frames. In particular, a front vehicle body includes a pair of right and left side frames 101 provided on both sides in the vehicle width direction and extending in a longitudinal direction of the motor vehicle 100, and a front frame 102 disposed between the front ends of the pair of side frames 101.

An engine compartment R is defined in the front portion of the vehicle body, in which the power train unit P is mounted. The engine compartment R includes, a bonnet (not shown) positioned above the power train unit P, and is configured to extend upward as it goes rearward from the front, and a dash panel 103 positioned behind the engine 1 as shown in FIG. 1 to separate the engine compartment R from a cabin accommodating the passengers. The dash panel 103 is an example of a "partition wall" because it is positioned behind the engine 1, and defines a rear portion of the engine compartment R. The partition wall is not limited to the dash panel 103, and may be made of at least one of a plurality of members, such as a cowl (not shown) positioned above the dash panel 103 and a floor panel (not shown).

As shown in FIG. 1, a tunnel portion T is formed at a center portion of the dash panel 103 in the vehicle width direction to extend rearward from the dash panel 103 in the longitudinal direction of the vehicle. A duct for guiding exhaust gas to a muffler may be positioned in the tunnel portion T, or wind blowing out from the engine compartment R when the vehicle is traveling is caused to flow through the tunnel portion T.

Figure 11:
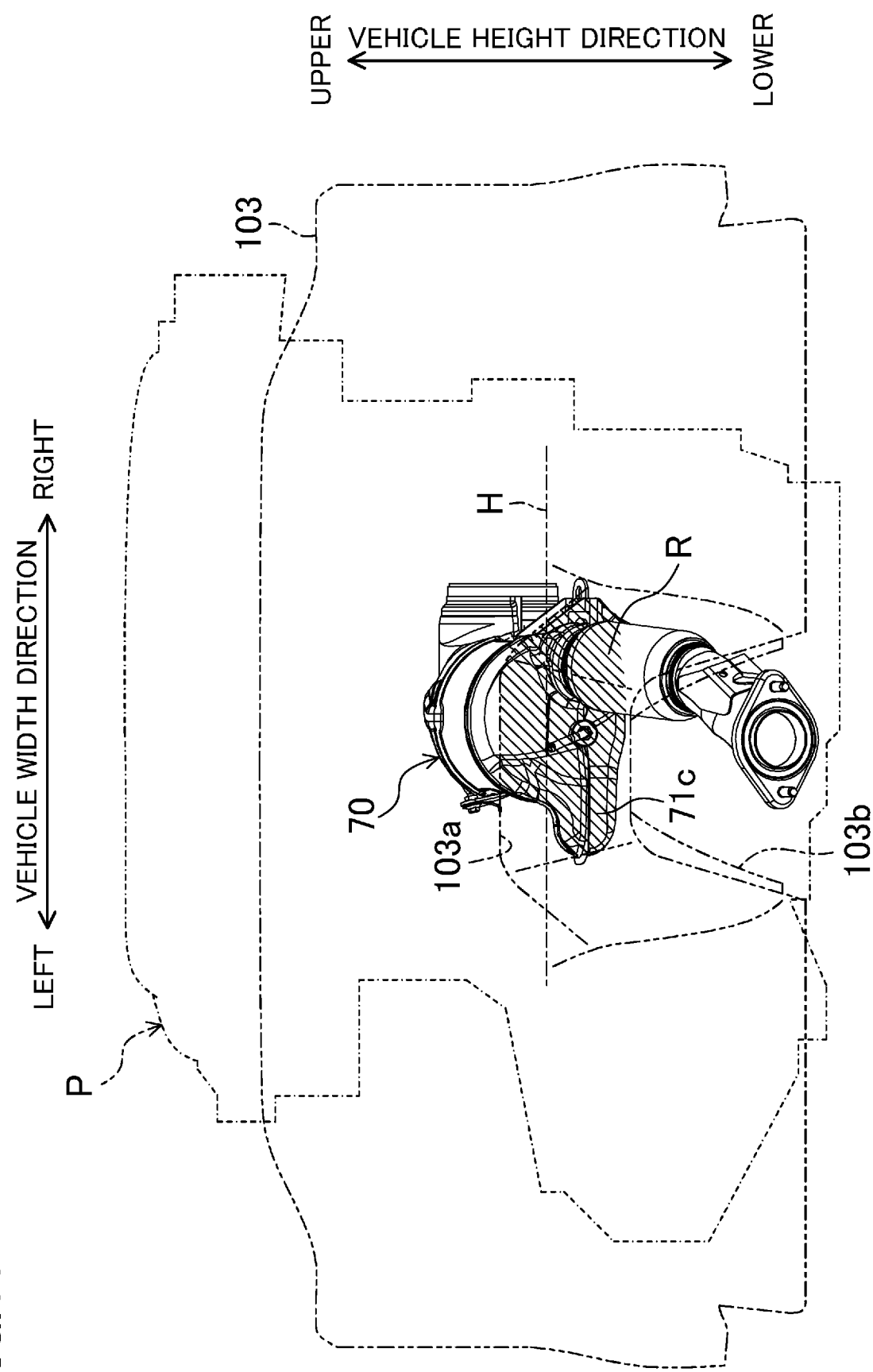
FIG. 11 is a diagram illustrating a relative positional relationship between the exhaust purification system and a dash panel as viewed from behind.

Specifically, the tunnel portion T is formed by a ceiling surface 103a which extends in the longitudinal direction of the vehicle and projects upward. More specifically, as shown in FIG. 11, the ceiling surface 103a has a substantially trapezoidal cross section increasing in width from the top to the bottom and having an open bottom, and extends in the longitudinal direction of the vehicle. Although not shown in detail, a floor panel constituting the cabin together with the dash panel 103 also has a tunnel portion T which is formed by a ceiling surface having a similar shape, and is connected to the tunnel portion of the dash panel 103.

Figure 12:
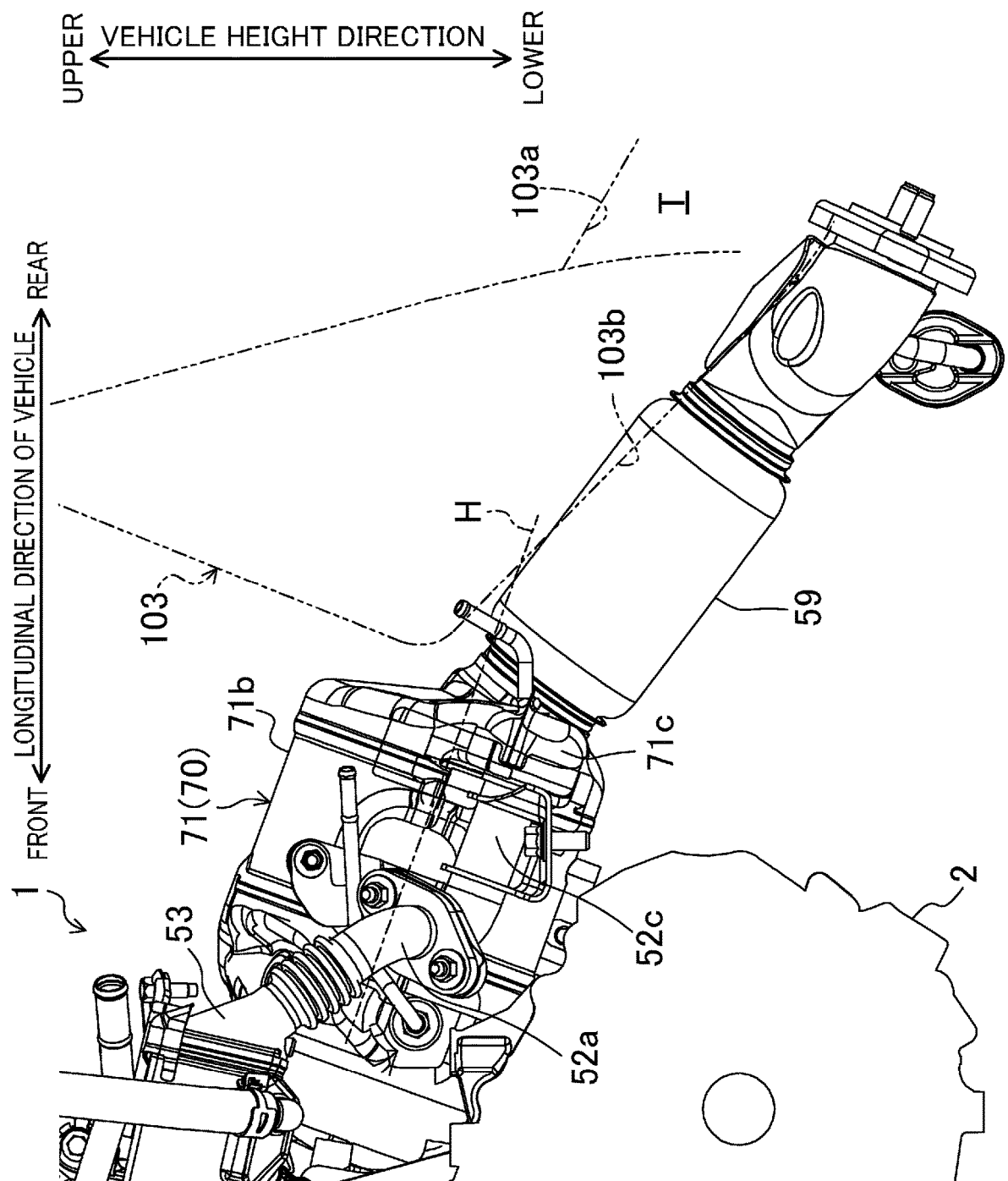
FIG. 12 is a diagram illustrating the relative positional relationship between the exhaust purification system and the dash panel as viewed from the left.

As shown in FIG. 1 and FIGS. 11 to 13, portions of the ceiling surface 103a, which respectively form lower corner portions of the substantially trapezoidal shape, constitute inclined portions 103b each of which is inclined downward toward the rear side in the longitudinal direction of the vehicle as it goes downward from the top as shown in FIG. 12. As can be seen from FIG. 13, when viewed from below, each inclined portion 103b forms an inclined surface which is tilted inward (inward in the vehicle width direction) as it goes rearward.

As described above, the motor vehicle 100 is configured as a right-hand drive vehicle. Therefore, a brake unit B to be operated by the driver is provided in front of a right portion of the dash panel 103.

The engine 1 includes four cylinders 11 positioned in line and is configured as a so-called in-line four-cylinder transverse engine including four cylinders 11 positioned along the vehicle width direction. In this embodiment, a longitudinal direction of the engine, along which the four cylinders 11 are positioned (cylinder bank direction), substantially agrees with the vehicle width direction, while an engine width direction substantially agrees with the longitudinal direction of the vehicle.

In an in-line multi-cylinder engine, the cylinder bank direction coincides with the direction of a center axis of a crankshaft 16 serving as an engine output shaft (engine output shaft direction). In the following description, all of these directions are referred to as a "cylinder bank direction" (or a vehicle width direction).

Hereinafter, unless otherwise noted, the term "front" means one side in the engine width direction (the front in the longitudinal direction of the vehicle), and the term "rear" means the other side in the engine width direction (the rear in the longitudinal direction of the vehicle). The term "left" means one side in the longitudinal direction of the engine (the cylinder bank direction), i.e., the left in the vehicle width direction, the rear side of the engine, and toward the transmission 2 of the power train unit P, and the term "right" means the other side in the longitudinal direction of the engine (the cylinder bank direction), i.e., the right in the vehicle width direction, the front side of the engine, and toward the engine 1 of the power train unit P.

In the following description, the term "upper," "top," or "above" means the upper side in the vehicle height direction when the power train unit P is mounted on the motor vehicle 100 (hereinafter also referred to as an "in-vehicle mounted state), and the term "lower," "bottom," or "below" means the lower side in the vehicle height direction in the in-vehicle mounted state.

The transmission 2 is attached to a left side surface of the engine 1, and is adjacent to the engine 1 in the cylinder bank direction. As shown in FIG. 2, the transmission 2 has a smaller dimension in the height direction than the engine 1.

An engine cover 4 covering the engine 1 is provided above the engine 1 (specifically, above a cylinder head 14). As shown in FIG. 3, a rear end portion of the engine cover 4 is directed obliquely downward toward the rear side, so that wind flowing along a lower surface of the rear end portion when the vehicle is traveling is guided to the exhaust passage 50 (specifically, to an exhaust manifold 60).

(Schematic Configuration of Engine)

Next, a schematic configuration of the engine 1 constituting the power train unit P will be described.

In this exemplary configuration, the engine 1 is a front-intake rear-exhaust engine. Specifically, the engine 1 includes: an engine body 10 having the four cylinders 11; an intake passage 30 provided to the front of the engine body 10 and communicating with the cylinders 11 via intake ports 18; and an exhaust passage 50 provided to the rear of the engine body 10 and communicating with the cylinders 11 via exhaust ports 19.

The intake passage 30 passes the gas (fresh air) introduced from the outside and supplies the gas to each cylinder 11 of the engine body 10. In this exemplary configuration, the intake passage 30 constitutes an intake system in which a plurality of passages for guiding the gas and a device such as a supercharger or an intercooler are combined together in the front portion of the engine body 10.

The engine body 10 combusts an air-fuel mixture of gas and fuel supplied from the intake passage 30 in the cylinders 11. Specifically, the engine body 10 includes, from the bottom to the top, an oil pan 12, a cylinder block 13 attached above the oil pan 12, and a cylinder head 14 placed above the cylinder block 13. Power generated by combusting the air-fuel mixture is delivered to the outside through the crankshaft 16 provided in the cylinder block 13.

The four cylinders 11 are provided inside the cylinder block 13. The four cylinders 11 are positioned in line along the central axis of the crankshaft 16 (along the cylinder bank). Each of the four cylinders 11 is formed like a tube. The central axes of the cylinders 11 (hereinafter referred to as "cylinder axes") extend parallel to each other, and perpendicularly to the cylinder bank direction. The four cylinders 11 shown in FIG. 1 may be hereinafter referred to as a first cylinder 11A, a second cylinder 11B, a third cylinder 11C, and a fourth cylinder 11D in this order from the right along the cylinder bank.

The cylinder head 14 has two intake ports 18 provided for each cylinder 11 (only those for the first cylinder 11A is shown). The two intake ports 18 are adjacent to each other along the cylinder bank and communicate with the cylinder 11.

The cylinder head 14 also has two exhaust ports 19 provided for each cylinder 11. The two exhaust ports 19 communicate with the cylinder 11.

The exhaust passage 50 is a passage through which exhaust gas produced through combustion of the air-fuel mixture is discharged from the engine body 10. Specifically, the exhaust passage 50 is positioned behind the engine body 10, and communicates with the exhaust ports 19 of the cylinders 11. The exhaust passage 50 is provided with an exhaust manifold 60 and an exhaust purification system 70 positioned in this order from the upstream side in the flow direction of the exhaust gas. The exhaust purification system 70 houses therein a gasoline particulate filter (GPF) device 73 which functions as a gasoline particulate filter for purifying the exhaust gas. Note that the exhaust purification system 70 is an example of an "exhaust purifier," and the GPF device 73 is an example of a "purification unit."

In this exemplary configuration, the exhaust passage 50 constitutes an exhaust system in which a plurality of passages for guiding the gas such as the exhaust manifold 60 is combined with a device such as the exhaust purification system 70.

Referring back to FIG. 1, the intake passage 30 and the exhaust passage 50 are respectively connected to a front surface and rear surface (an outer surface 14a described later) of the engine body 10. An EGR passage 52 which connects the intake passage 30 and the exhaust passage 50 together to constitute an external EGR system is connected to the outside (the left side in the drawing) of the engine body 10. The EGR passage 52 allows part of the burned gas to flow back to the intake passage 30. An upstream end of the EGR passage 52 is connected to a portion (delivering portion 71c to be described later) of the exhaust purification system 70 located downstream of the GPF device 73. A downstream end of the EGR passage 52 is connected to a portion of the intake passage 30 downstream of a throttle valve (not shown).

The EGR passage 52 is provided with a water-cooled EGR cooler 53. The EGR cooler 53 cools the burned gas. The EGR cooler 53 receives heat only by an amount of heat used to cool the external EGR gas. Therefore, the EGR cooler 53 that received the heat can be used as a heat source.

(Configuration of Exhaust Passage)

Next, the configuration of the exhaust passage 50 of the engine 1 will be described in detail.

Figure 4:
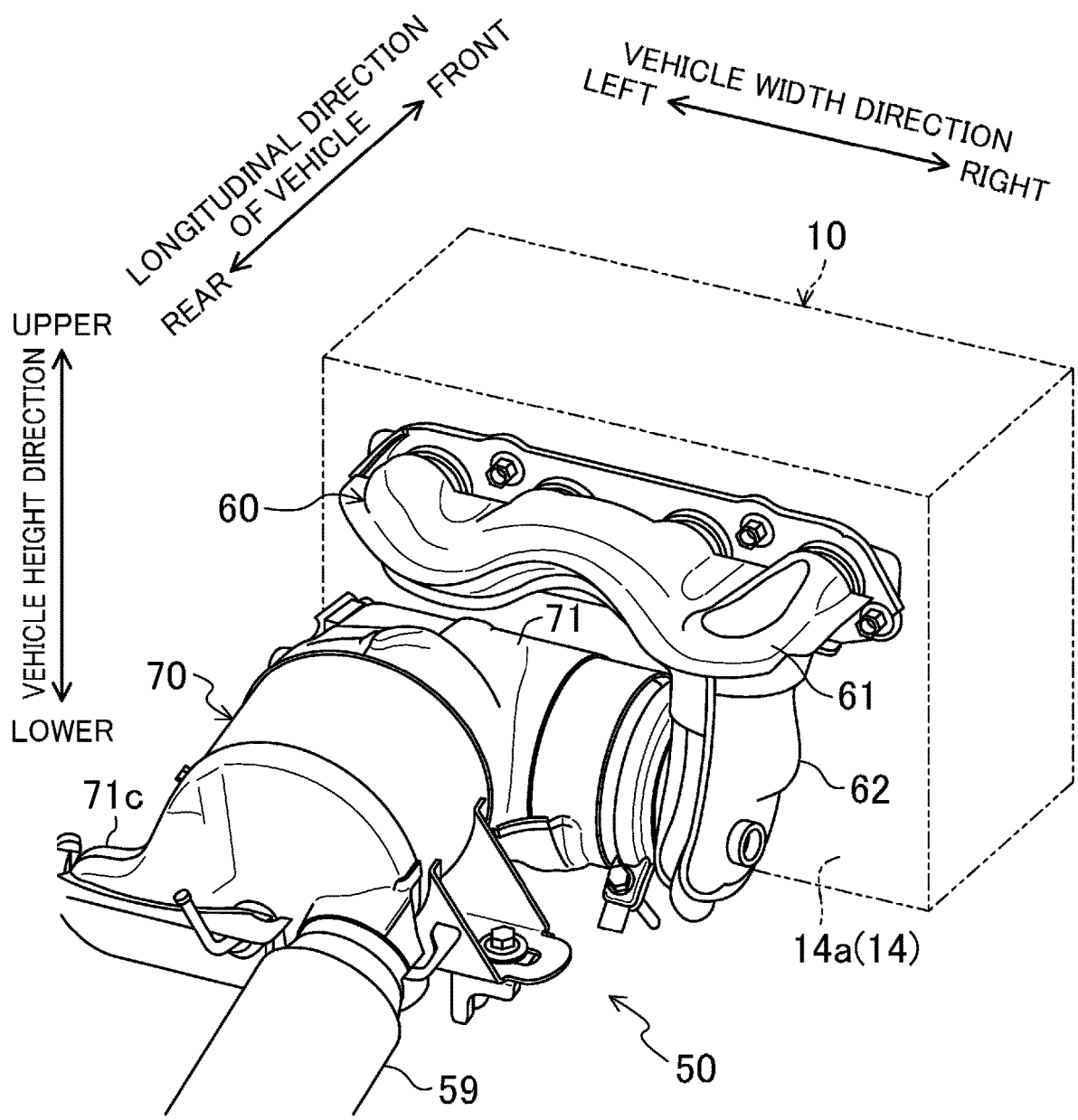
FIG. 4 is a perspective view illustrating an overall configuration of the exhaust passage.
Figure 5:
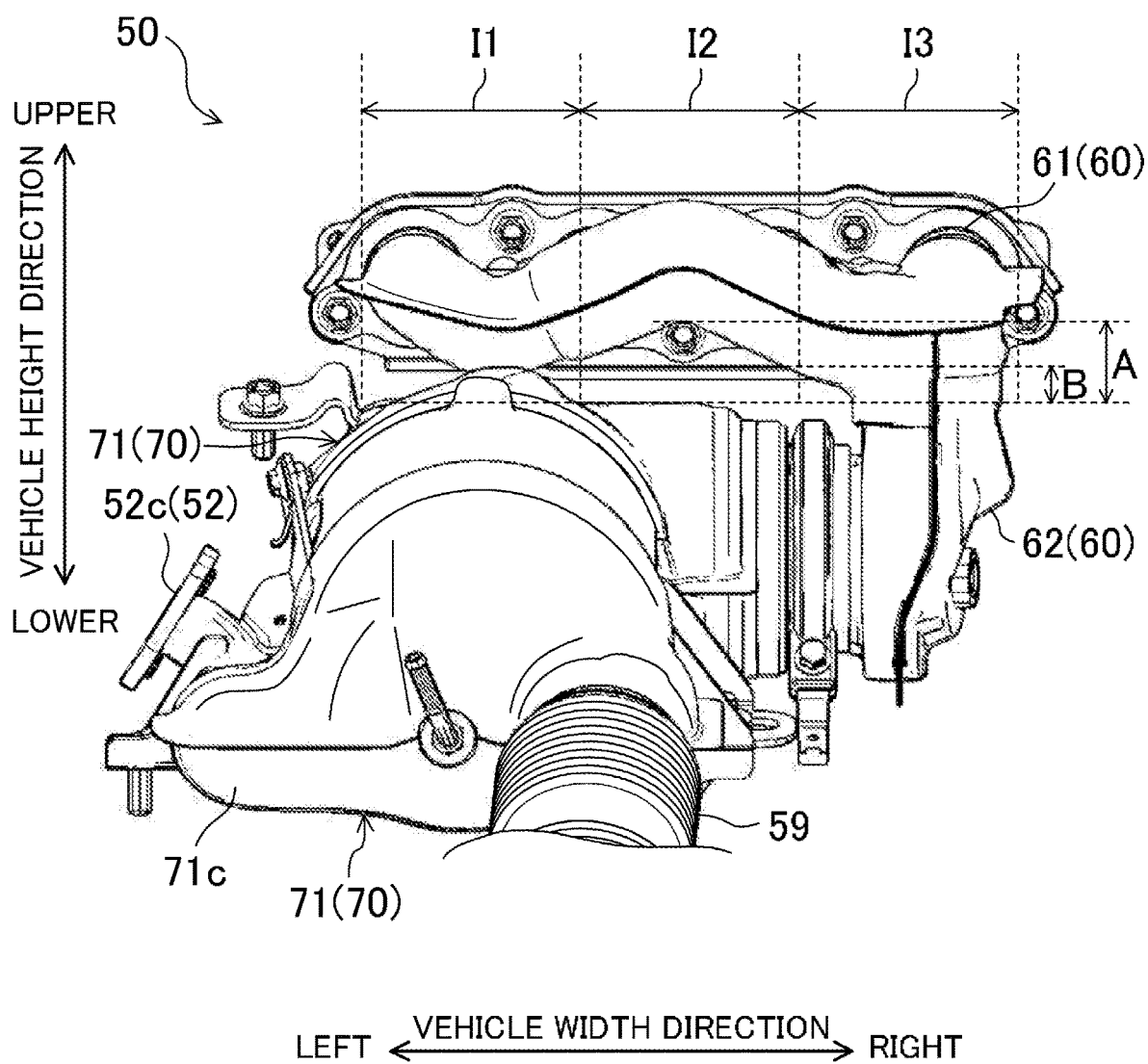
FIG. 5 illustrates the exhaust passage as viewed from behind.
Figure 6:
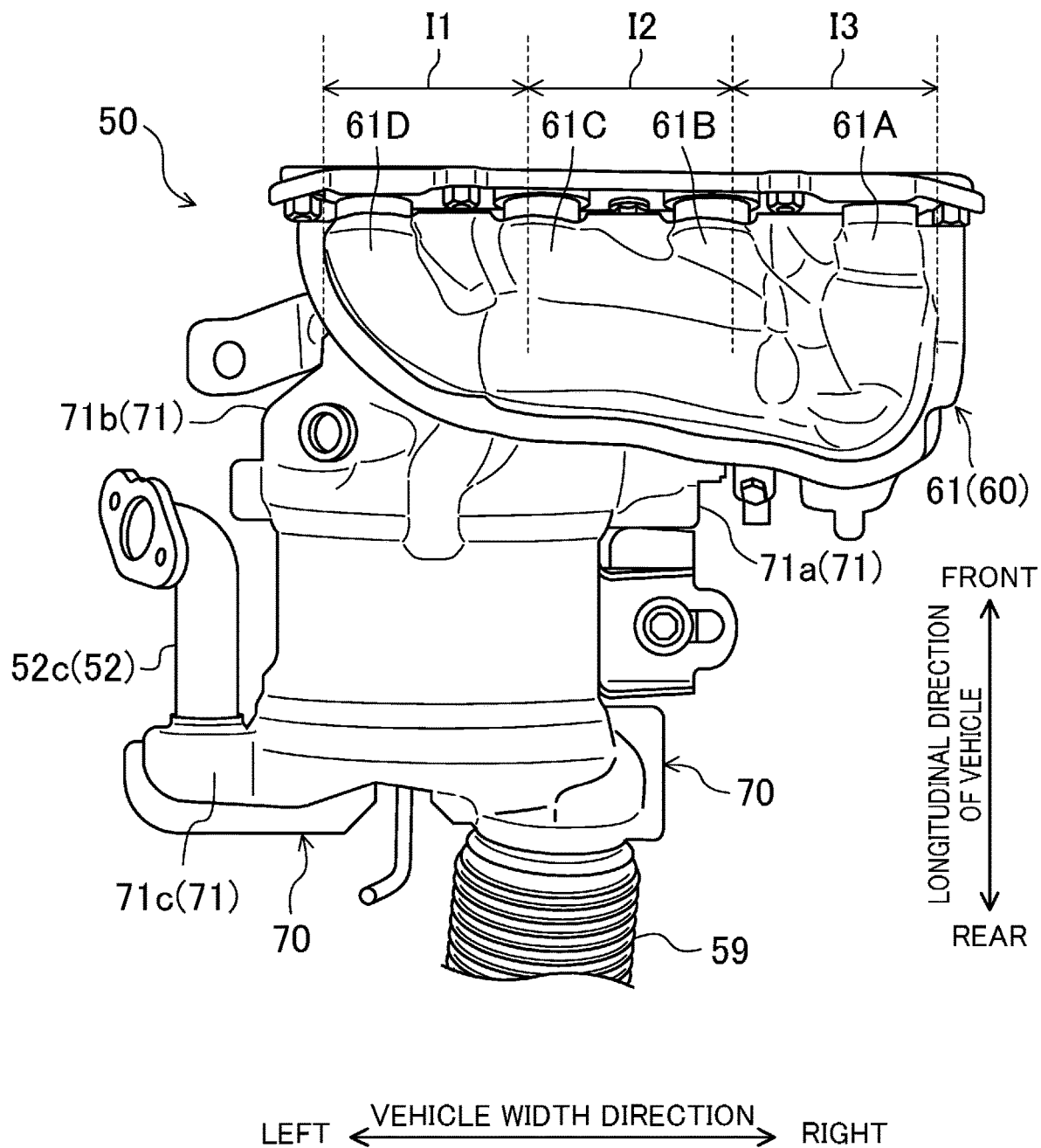
FIG. 6 illustrates the exhaust passage as viewed from above.
Figure 7:
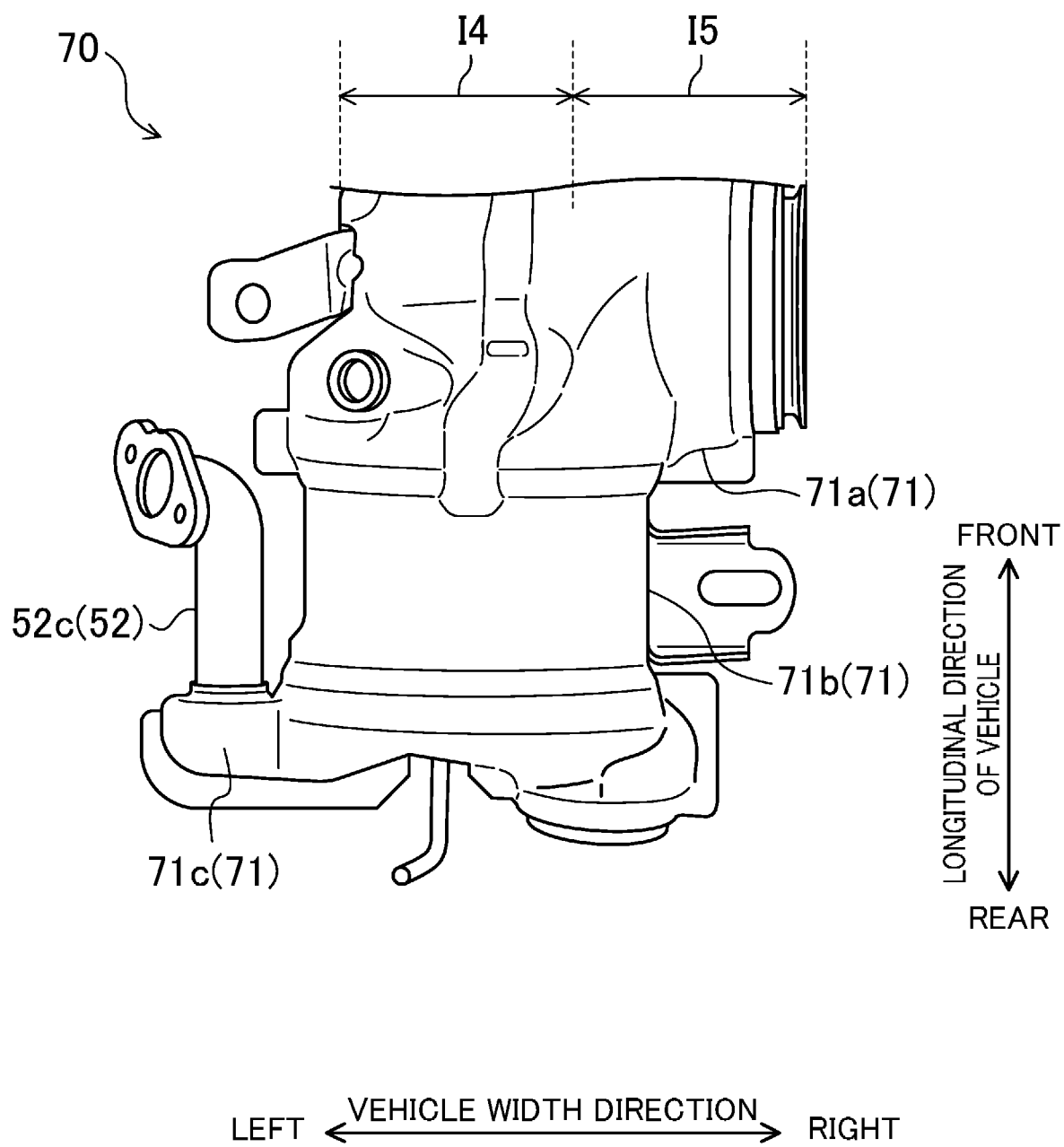
FIG. 7 illustrates an exhaust purification system as viewed from above.
Figure 8:
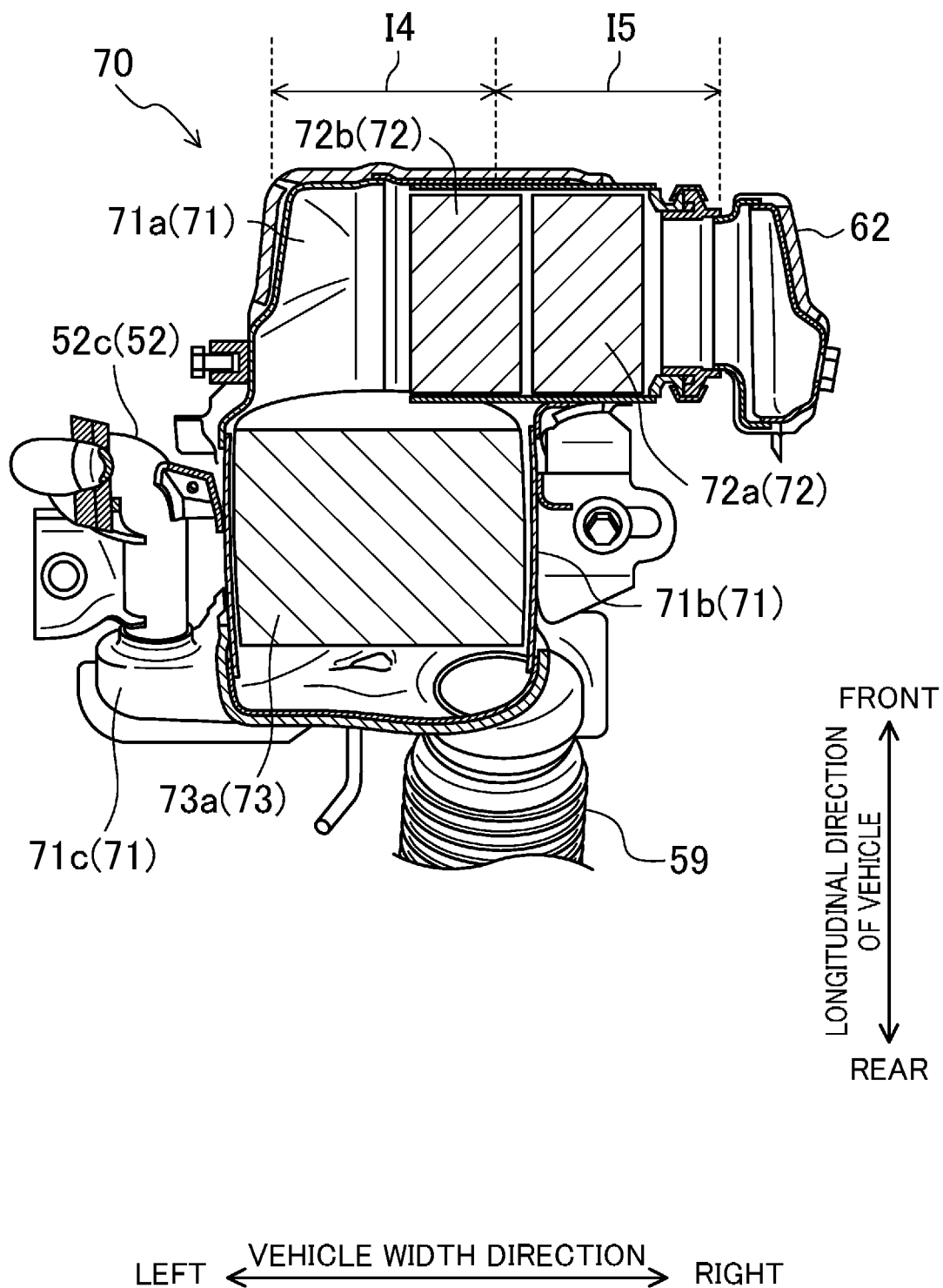
FIG. 8 is a cross-sectional view illustrating an internal structure of the exhaust purification system.
Figure 13:
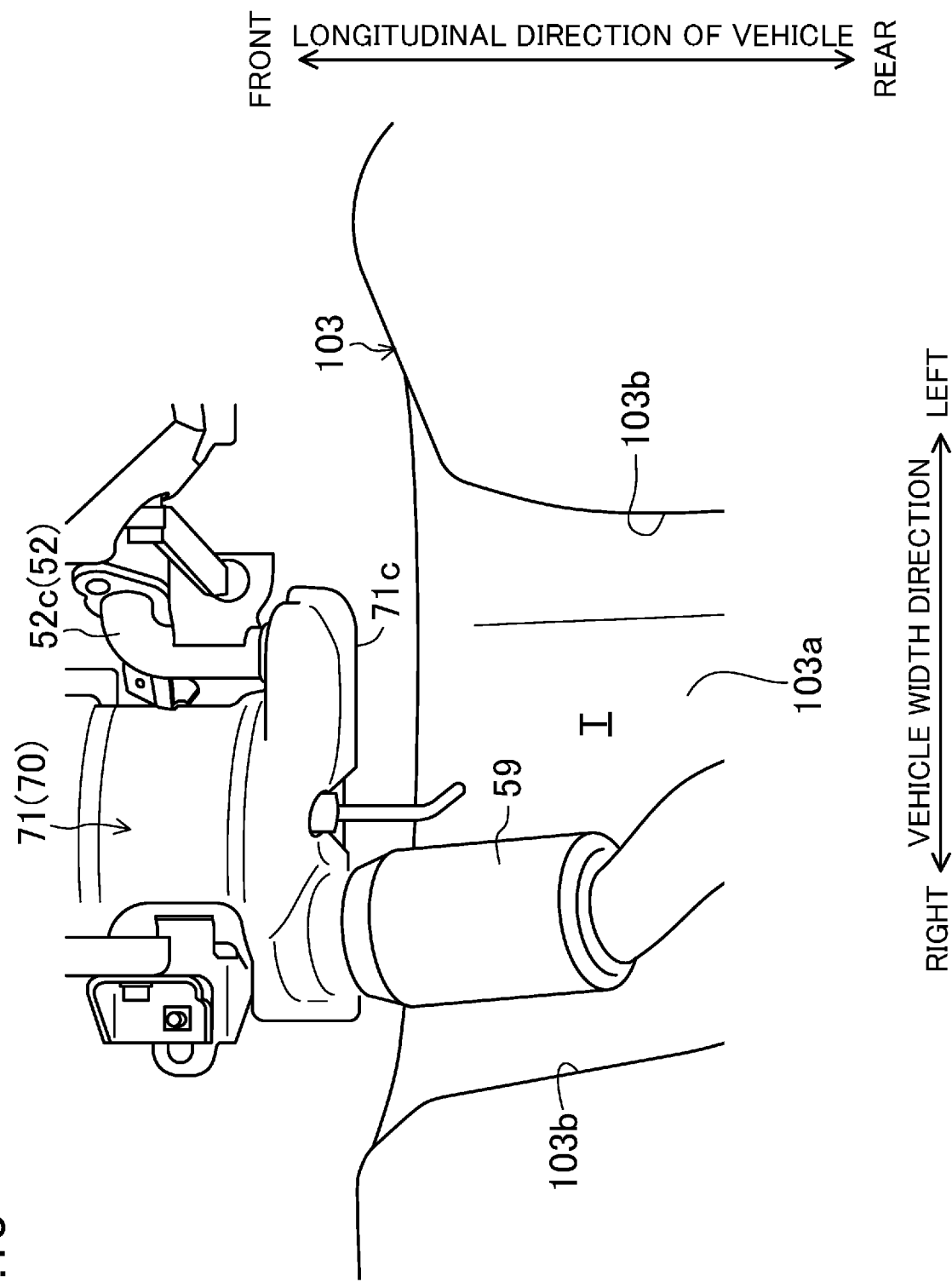
FIG. 13 is a diagram illustrating the relative positional relationship between the exhaust purification system and the dash panel as seen from below.

FIG. 4 is a perspective view illustrating an overall configuration of the exhaust passage 50. FIG. 5 illustrates the exhaust passage 50 as viewed from behind, and FIG. 6 illustrates the exhaust passage 50 as viewed from above. FIG. 7 illustrates the exhaust purification system 70 as viewed from above, and FIG. 8 is a cross-sectional view illustrating an internal structure of the exhaust purification system 70. FIGS. 11 and 12 are diagrams illustrating a relative positional relationship between the exhaust purification system 70 and the dash panel 103 as viewed from behind, and the left, respectively. FIG. 13 is a diagram illustrating the relative positional relationship between the exhaust purification system and the tunnel portion T as viewed from below.

Each of the components of the exhaust passage 50 is connected to the engine body 10, in particular, to a rear outer surface 14a of the cylinder head 14. As described above, the exhaust passage 50 is comprised of a combination of the exhaust manifold 60 and the exhaust purification system 70. In particular, the exhaust purification system 70 is connected to the cylinder head 14 via the exhaust manifold 60.

First, the configuration of the exhaust manifold 60 will be described.

The exhaust manifold 60 is positioned below an upper end portion of the cylinder head 14 as shown in FIG. 5, and is configured as a duct having branch passages 61 each of which is connected to an associated one of the cylinders 11 via the exhaust ports 19 of the cylinder head 14, and a meeting portion 62 at which the branch passages 61 meet together to be connected to the exhaust purification system 70 as shown in FIG. 6.

The branch passages 61 are substantially in the shape of W when viewed from the rear side. Specifically, when the branch passages 61 are divided into three portions along the cylinder bank, a portion curved to bulge downward (see section I1), a portion curved to bulge upward (see section I2), and a portion curved to bulge downward again (see section I3) are positioned in this order from the left end to the right end (see FIG. 6).

The branch passages 61 include a first branch passage 61A connected to the first cylinder 11A, a second branch passage 61B connected to the second cylinder 11B, a third branch passage 61C connected to the third cylinder 11C, and a fourth branch passage 61D connected to the fourth cylinder 11D.

As shown in FIG. 7, the first branch passage 61A extends substantially rearward from the outer surface 14a of the cylinder head 14 when viewed from above. When viewed from above, the second to fourth branch passages 61B to 61D extend obliquely rearward to the right from the outer surface 14a of the cylinder head 14, and merge with the first branch passage 61A.

The meeting portion 62 is located on one side in the cylinder bank direction of the branch passages 61 (specifically, near the first cylinder 11A and on the right in the vehicle width direction), and extends downward on this side.

Specifically, the meeting portion 62 is positioned at substantially the same position as the first cylinder 11A in the cylinder bank direction, and extends downward from a downstream end (rear end) of the first branch passage 61A. That is, an upstream end (upper end) of the meeting portion 62 is connected to the downstream end of the branch passage 61. In contrast, a downstream end (lower end) of the meeting portion 62 is open to the left, to which the upstream end of a casing 71 constituting the exhaust purification system 70 is connected.

Next, the configuration of the exhaust purification system 70 will be described.

From the viewpoint of the relative positional relationship with the power train unit P, or the vehicle body of the motor vehicle 100, the exhaust purification system 70 is positioned immediately behind the cylinder block 13, located at approximately the center of the engine 1 in the vertical direction, and slightly shifted to the left in the vehicle width direction (or to the right relative to the entire power train unit P including the transmission 2). As indicated by region R shown in FIG. 11, the exhaust purification system 70 is positioned to overlap with the tunnel portion T of the dash panel 103 when viewed from the rear side of the vehicle.

As shown in FIGS. 3, 12, and 13, the exhaust purification system 70 is located in front of the dash panel 103 constituting the engine compartment R in the longitudinal direction of the vehicle, and is supported to extend toward the tunnel portion T of the dash panel 103.

From the viewpoint of the relative positional relationship with the exhaust manifold 60, the exhaust purification system 70 is located below the branch passage 61, and is positioned on the other side in the cylinder bank direction (specifically, near the fourth cylinder 11D and on the left side in the vehicle width direction) of the lower end portion of the meeting portion 62.

Further, as shown in FIG. 12, in the vehicle height direction, the exhaust purification system 70 is located at the upper end of the inclined portion 103b (specifically, a corner portion of the dash panel 103 bent toward the rear side). Although not shown in the drawings, the exhaust purification system 70 is positioned at substantially the same level as the brake unit B described above.

Specifically, the exhaust purification system 70 includes a substantially L-shaped casing 71, and a catalyst converter 72 and a GPF device 73 housed in the casing 71.

As shown in FIG. 7, the casing 71 is a pipe substantially in the shape of L positioned with its horizontal bar extending in the vehicle width direction and a vertical stem extending from the bar toward the rear side of the motor vehicle 100 (in particular, an L-shape inverted in the longitudinal direction of the vehicle).

A portion of the casing 71 corresponding to the horizontal bar of the letter L (hereinafter referred to as a "bar portion" denoted by reference character "71a") has a right end that opens toward the right. The right end serves as an upstream end of the casing 71, and by extension, of the entire exhaust purification system 70, and is directly connected to the downstream end of the meeting portion 62 as described above. The bar portion 71a, including the right end serving as the upstream end of the casing 71, is positioned immediately below the exhaust manifold 60 (specifically, the branch passage 61). On the other hand, a left end of the bar portion 71a is connected to a front end of a portion of the casing 71 corresponding to the vertical stem of the letter L (hereinafter referred to as a "stem portion" denoted by reference character "71b").

As can be seen from FIGS. 5 to 8, when the bar portion 71a is divided into two sections aligned in the cylinder bank direction, a downstream one of the sections on the left (section I4) is vertically aligned with the portion of the branch passage 61 curved to bulge downward (section I1).

An upstream one of the two sections of the bar portion 71a on the right (section I5) is vertically aligned with the portion of the branch passage 61 curved to bulge upward (section I2).

As shown in FIGS. 5, 7, and 8, the stem portion 71b of the casing 71 projects toward the rear side of the motor vehicle 100 (in particular, toward the tunnel portion T of the dash panel 103). A rear end of the stem portion 71b serves as a downstream end of the casing 71, and by extension, of the entire exhaust purification system 70, and is positioned behind the exhaust manifold 60, and opens rearward. An upstream end of an exhaust duct 59 is connected to the opening. The exhaust duct 59 is drawn out of the engine compartment R via the tunnel portion T described above, and is connected to a muffler (not shown) at the rear portion of the motor vehicle 100.

The EGR passage 52 is connected to the casing 71. In particular, an upstream end portion 52c of the EGR passage 52 disclosed herein is connected to a lower portion of the exhaust purification system 70 in the vertical direction of the vehicle. Specifically, as shown in FIGS. 11 to 13, the upstream end portion 52c is connected to a lower one of halves (see the chain line H in FIGS. 11 and 12) of the exhaust purification system 70 (specifically, the casing 71) obtained by dividing the system 70 in the vehicle width direction, and to a left one of halves of the casing 71 obtained by dividing the casing 71 in the vertical direction of the vehicle.

More specifically, as shown in FIG. 12, the upstream end portion 52c of the EGR passage 52 is connected to the rear end of the lower portion of the exhaust purification system 70, and is positioned below the upper end of the inclined portion 103b in the vehicle height direction. Therefore, the upstream end portion 52c of the EGR passage 52 is positioned in front of the inclined portion 103b.

As described above, the exhaust purification system 70 is positioned to overlap with the tunnel portion T of the dash panel 103 when viewed from the rear side of the vehicle. In this arrangement, the upstream end portion 52c of the EGR passage 52 also overlaps with the tunnel portion T.

Specifically, in a lower half (and a left half thereof) of the stem portion 71b located downstream of the GPF device 73, a delivering portion 71c is provided to deliver the burned gas out of the casing 71, and the upstream end portion 52c of the EGR passage 52 is connected to the delivering portion 71c.

The delivering portion 71c is configured to deliver the gas through the opening cut through the bottom of the rear left end of the stem portion 71b, and projects in a direction away from the dash panel 103.

Specifically, the delivering portion 71c according to this exemplary configuration projects outward (specifically, to the left) in the vehicle width direction. A left end of the delivering portion 71c opens toward the front, and the upstream end portion 52c of the EGR passage 52 is connected to the opening. Thus, the upstream end portion 52c connected to the delivering portion 71c extends substantially forward as shown in FIG. 7, for example.

Further, as shown in FIG. 8, the delivering portion 71c projects from the side opposite in the vehicle width direction to a portion (passage portion) of the bar portion 71a corresponding to the section I5. Taking the arrangement of the passage portion and the delivering portion 71c sandwiching the GPF device 73 in the longitudinal direction of the vehicle into account, the passage portion and the delivering portion 71c are positioned to face each other in the cross section shown in FIG. 8. The passage portion and the delivering portion 71c are both configured to guide the gas from the right side to left side in the vehicle width direction.

As shown in FIG. 13, the casing 71 of the exhaust purification system 70 is offset to the right in the vehicle width direction with respect to the tunnel portion T. Therefore, the delivering portion 71c and the upstream end portion 52c connected to the delivering portion 71c are also offset to the right. Both of the delivering portion 71c and the upstream end portion 52c are positioned in the left half of the casing 71, but are spaced apart from the left side surface of the ceiling surface 103a by the amount of the offset toward the right as can be seen from FIG. 13.

Since the motor vehicle 100 is a right-hand drive vehicle as described above, the brake unit B is positioned on the right portion of the dash panel 103. Therefore, as schematically shown in FIG. 1, the upstream end portion 52c of the EGR passage 52 is positioned opposite to (i.e., on the left of) the brake unit B with the casing 71 interposed therebetween.

As shown in FIG. 8, the catalyst converter 72 is a two-bed catalyst converter having two catalysts, namely, first and second honeycomb catalysts 72a and 72b, positioned in series in a catalyst container. The first honeycomb catalyst 72a includes a honeycomb carrier supporting a first catalyst thereon. The second honeycomb catalyst 72b includes a honeycomb carrier supporting a second catalyst thereon.

The first catalyst is active in an oxidation reaction of unsaturated high hydrocarbon (HC), such as toluene, at a low temperature compared to the second catalyst. The second catalyst is active in an oxidation reaction of saturated low hydrocarbon (HC), such as isopentane, at a low temperature compared to the first catalyst.

The two honeycomb catalysts 72a and 72b, each of which is substantially formed in a short tube, are housed in an upstream portion (see section I5), which is a right portion, of the bar portion 71a of the casing 71. Accordingly, the two honeycomb catalysts 72a and 72b are vertically aligned with the portion of the branch passage 61 curved to bulge upward (see section I2). The portion of the branch passage 61 corresponding to the section I2 is spaced apart upward from the two honeycomb catalysts 72a and 72b by the height of the upward bulge (see also distances A and B in FIG. 5).

A downstream portion (see section I4), which is a left portion, of the bar portion 71a is a hollow portion. Therefore, the hollow portion is vertically aligned with the portion of the branch passage 61 curved to bulge downward (see section I1). The portion of the branch passage 61 corresponding to the section I1 approaches the hollow portion below it by the height of the downward bulge.

A downstream portion (see section I4), which is a left portion, of the bar portion 71a is a hollow portion. Therefore, the hollow portion is vertically aligned with the portion of the branch passage 61 curved to bulge downward (see section I1). The portion of the branch passage 61 corresponding to the section I1 approaches the hollow portion below it by the height of the downward bulge.

The GPF device 73 includes a catalyst-carrying filter 73a housed in a filter container. The catalyst-carrying filter 73a includes a ceramic filter body made of an inorganic porous material, and the second catalyst supported thereon. Although not shown in the drawings, the catalyst-carrying filter 73a has a honeycomb structure, and includes a large number of cells extending parallel to each other.

The GPF device 73 is formed in a substantially tubular shape, and is housed in the stem portion 71b of the casing 71. In view of the relative positional relationship between the stem portion 71b and the exhaust manifold 60, the GPF device 73 is positioned behind the branch passage 61 and the meeting portion 62.

(Configuration of External EGR System)

Figure 9:
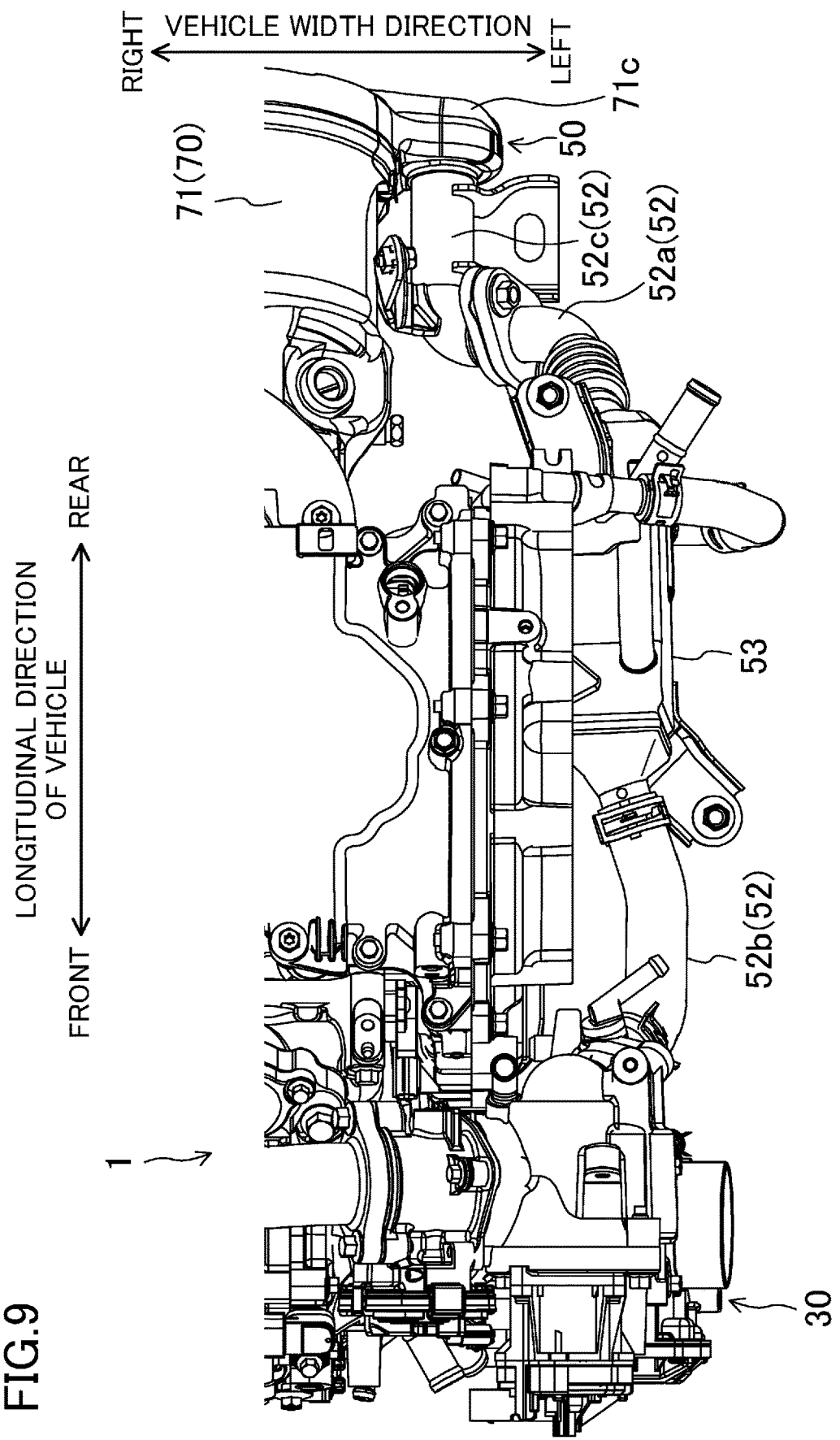
FIG. 9 illustrates an external EGR system as viewed from the left.
Figure 10:
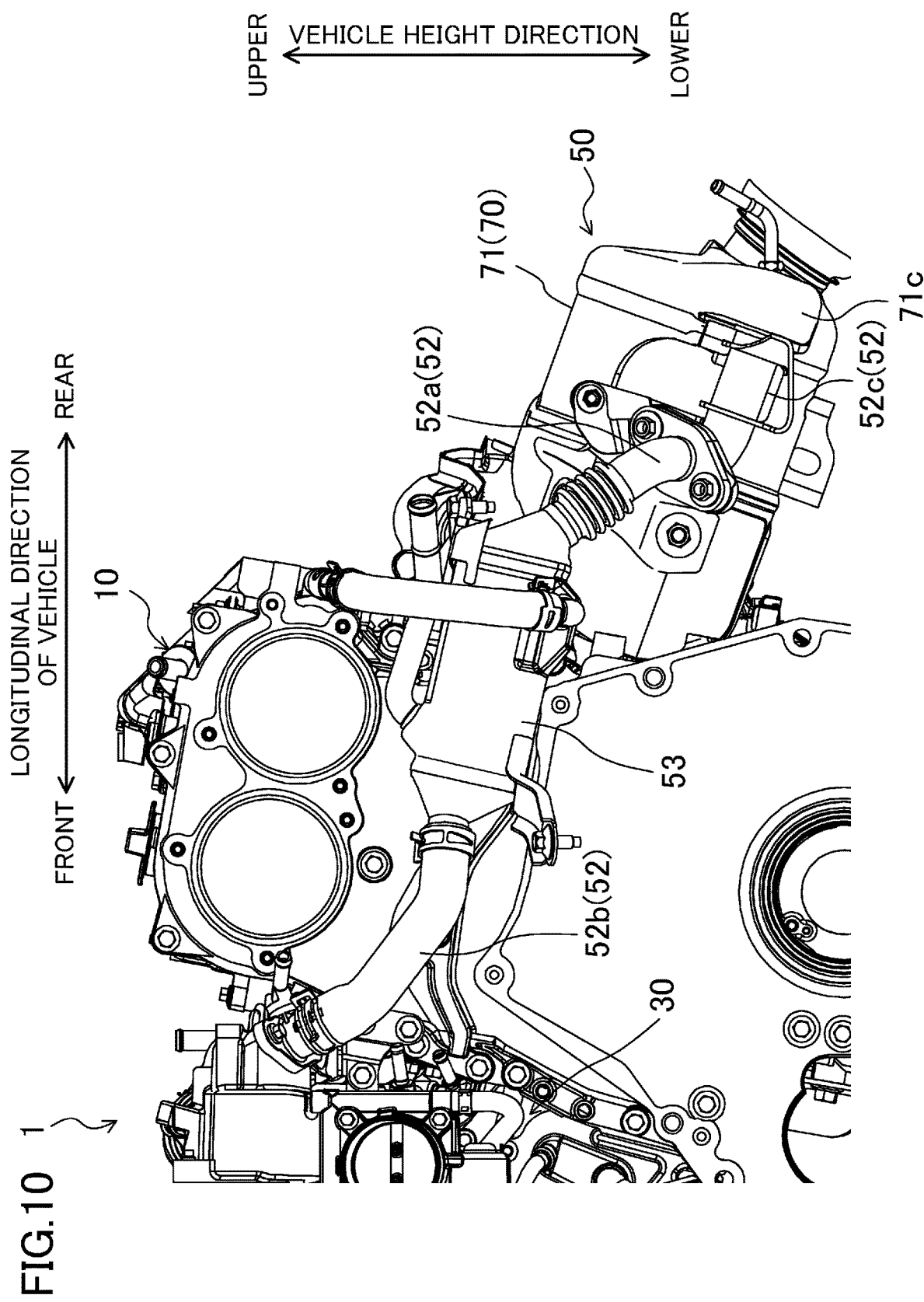
FIG. 10 illustrates the external EGR system as viewed from above.

FIG. 9 illustrates an external EGR system as viewed from the left, and FIG. 10 illustrates the external EGR system as viewed from above. In FIGS. 9 and 10, the transmission 2 is not shown.

As illustrated in FIG. 9, the EGR passage 52 branches off from the exhaust passage 50 with the catalyst purification system 70 disposed therein, and has a downstream end portion connected to the intake passage 30.

As described above, the EGR cooler 53 is disposed in the EGR passage 52 to cool the gas passing through the EGR passage 52. Hereinafter, of the EGR passage 52, a portion connecting the exhaust passage 50 and the EGR cooler 53 will be referred to as an upstream EGR passage 52a, and a portion connecting the EGR cooler 53 and the intake passage 30 will be referred to as a downstream EGR passage 52b. An upstream end of the upstream EGR passage 52a is the upstream end portion 52c described above.

Specifically, as illustrated in FIGS. 9 and 10, the upstream EGR passage 52a extends obliquely upward and forward along the left part of the casing 71, and then turns left not to interfere with the left part of the engine body 10. Then, the upstream EGR passage 52a extends obliquely upward and forward again to reach the EGR cooler 53. The upstream end of the upstream EGR passage 52a is connected to the delivering portion 71c of the casing 71 in the exhaust purification system 70, and the downstream end (front end) of the upstream EGR passage 52a is connected to the upstream end (rear end) of the EGR cooler 53, as described above.

The EGR cooler 53 is shaped into a square tube slightly angled with respect to the longitudinal direction. At least when the engine is mounted on the vehicle, the EGR cooler 53 is positioned so that its openings at both ends are obliquely oriented toward the front and rear sides in the longitudinal direction at substantially the same location of the exhaust manifold 60 in the vertical direction (i.e., above the exhaust purification system 70). The upstream end of the EGR cooler 53 is directed obliquely downward and rearward, and is connected to the downstream end of the upstream EGR passage 52a as described above. Meanwhile, the downstream end (front end) of the EGR cooler 53 is directed obliquely upward and forward, and is connected to the upstream end (rear end) of the downstream EGR passage 52b.

The downstream EGR passage 52b extends upward as it goes from the upstream to the downstream along the flow direction of the gas. Specifically, as illustrated in FIGS. 9 and 10, the downstream EGR passage 52b extends obliquely upward and forward along the left part of the engine body 10, and turns substantially forward. The upstream end (rear end) of the downstream EGR passage 52b is connected to the downstream end of the EGR cooler 53 as described above. On the other hand, the downstream end (front end) of the downstream EGR passage 52b is connected to a rear portion of the intake passage 30.

(Configuration Related to Collision of Motor Vehicle)

As shown in FIG. 1, when the engine 1 is mounted on the front portion of the vehicle body, at least part of the exhaust passage 50 is located at a rear portion of the engine compartment R. In this case, if the engine is a rear exhaust engine, in particular, the GPF device 73 connected to the exhaust passage 50 is also located at the rear portion of the engine compartment R.

On the other hand, as described above, the EGR passage 52 branches off from the exhaust passage 50 downstream of the GPF device 73. Thus, the upstream end portion 52c of the EGR passage 52 becomes close to the rear end of the engine compartment R because the GPF device 73 is located at the rear portion of the engine compartment as shown in FIG. 8 and other drawings. Therefore, the upstream end portion 52c becomes close to a vehicle structure including the dash panel 103 (in particular, the tunnel portion T of the dash panel).

According to another possible configuration, the GPF device 73 may be inserted into the tunnel portion T of the dash panel 103, together with the delivering portion 71c. However, when such a configuration is adopted, the dimension of a passage from the engine 1 to the GPF device 73 is elongated in the longitudinal direction of the vehicle, which is not preferable in terms of the downsizing of the engine 1.

In recent years, when an elaboration is made to the configuration of the engine to downsize the engine, for example, the EGR passage 52 is required to be positioned as far as possible from the vehicle structure.

In contrast, as shown in FIGS. 12 and 13, the exhaust purification system 70 which houses the GPF device 73 is positioned in front of the tunnel portion T to extend toward the tunnel portion T, without being inserted into the tunnel portion T. This can shorten the dimension in the longitudinal direction of the vehicle, and by extension, can downsize the engine 1.

As shown in FIG. 11, the tunnel portion T is generally formed by the ceiling surface 103a that projects upward.

Thus, as shown in FIG. 12, connecting the EGR passage 52 to the lower half of the casing 71 of the exhaust purification system 70 can make the upstream end portion 52c further apart from the ceiling surface 103a as compared to the case where the EGR passage 52 is connected to the upper half of the casing 71, for example. This can block the upstream end portion 52c of the EGR passage 52 from approaching the ceiling surface 103a of the tunnel portion T.

In this way, the engine 1 can be downsized, and the EGR passage 52 and the vehicle structure can be positioned apart from each other.

Further, as shown in FIG. 12, when viewed from the side of the vehicle, the upstream end portion 52c of the EGR passage 52 is disposed below the upper end of the inclined portion 103b. Thus, the upstream end portion 52c of the EGR passage 52 is positioned in front of the inclined portion 103b. Taking the rearward inclination of the inclined portion 103b into account, the upstream end portion 52c of the EGR passage 52 can be positioned apart from the dash panel 103 in accordance with the inclination angle.

As shown in FIG. 11, the upstream end portion 52c of the EGR passage 52 is positioned to overlap with the tunnel portion T when viewed from the rear side of the vehicle. In this arrangement, if the engine 1 is moved immediately behind upon collision of the vehicle, for example, the upstream end portion 52c of the EGR passage 52 goes back to fit in the tunnel portion T.

Further, as shown in FIG. 13, projecting the delivering portion 71c in the direction away from the dash panel 103 advantageously allows the delivering portion 71c to be positioned apart from the dash panel 103, and by extension, from the inner wall surface of the tunnel portion T.

Moreover, as shown in FIG. 13, the delivering portion 71c is configured to project toward the left in the vehicle width direction. Here, for example, if the delivering portion 71c projects upward in the vehicle height direction, the delivering portion 71c becomes close to the ceiling surface 103a described above, i.e., projects in a direction toward the dash panel 103, which is disadvantageous.

On the other hand, if the delivering portion 71c projects downward in the vehicle height direction, the delivering portion 71c is spaced apart from the dash panel 103, and also from the ceiling surface 103a. In this case, however, moisture contained in the burned gas is accumulated at the lower end of the delivering portion 71c. This configuration is also disadvantageous because the moisture contains components that cause corrosion of metals, such as sulfuric acid.

The delivering portion 71c can be configured to project rearward in the longitudinal direction of the vehicle. However, this configuration may bring the delivering portion 71c closer to the dash panel 103. In addition, the distance between the delivering portion 71c and the EGR passage 52 increases in the longitudinal direction of the vehicle, which is disadvantageous also from the viewpoint of downsizing of the engine 1.

In another configuration, the delivering portion 71c can be configured to project forward in the longitudinal direction of the vehicle. However, this configuration may increase the curvature of a passage from the casing 71 to the delivering portion 71c, depending on the shape of the casing 71 in which the GPF device 73 is housed. This may be disadvantageous from the viewpoint of reduction of a flow path resistance.

Therefore, as shown in FIG. 13, projecting the delivering portion 71c toward the left in the vehicle width direction can block the delivering portion 71c from approaching the dash panel 103 without causing the aforementioned disadvantages.

Further, if the delivering portion 71c projects to the left, the delivering portion 71c is positioned opposite to (i.e., on the left of) the brake unit B with the casing 71 interposed therebetween as shown in FIG. 1.

Further, as shown in FIG. 8, the delivering portion 71c and a portion (passage section) of the bar portion 71a corresponding to the section I5 are positioned to face each other in the cross section shown in FIG. 8. In this arrangement, the gas can be guided more smoothly from the passage portion to the delivering portion 71c, as compared to the configuration in which the delivering portion 71c and the passage portion are both disposed on the right side. This can reduce the deterioration of the flow path resistance as much as possible, while keeping the delivering portion 71c and the dash panel 103 apart from each other.

Moreover, as shown in FIG. 13, the exhaust purification system 70 positioned to the right in the vehicle width direction can ensure a space on the left side of the exhaust purification system 70. This is advantageous in blocking the exhaust purification system 70 from approaching the vehicle structure including the dash panel 103.

Other Embodiments

In the foregoing embodiment, an in-line four-cylinder engine has been described as an example, but the present disclosure is not limited thereto. For example, the engine may be an in-line six-cylinder engine. In addition, the form of the exhaust manifold 60 may be appropriately changed depending on the number of cylinders.

In the foregoing embodiment, the transverse engine 1 has been described as an example, but the present disclosure is not limited thereto. For example, the engine may be a longitudinal engine. If the longitudinal engine is adopted, the exhaust manifold is positioned on either the left or right side of the engine, but the exhaust purification system 70 is positioned behind the engine similarly to the case where the transverse engine 1 is used. Therefore, the longitudinal engine also has the same advantages as the transverse engine.

In the foregoing embodiment, the upstream end portion 52c of the EGR passage 52 is positioned to overlap with the tunnel portion T when viewed from the rear side of the vehicle. However, the upstream end portion 52c may be positioned to overlap with the tunnel portion T when viewed from the front side of the vehicle. Even in this arrangement, the above-described advantages can be obtained.

DESCRIPTION OF REFERENCE CHARACTERS

1 Engine
11 Cylinder
14 Cylinder Head
19 Exhaust Port
30 Intake Passage
50 Exhaust Passage
↑EGR Passage
52c Upstream End Portion of EGR Passage
60 Exhaust Manifold
61 Branch Passage
62 Meeting Portion
70 Exhaust Purification System (Exhaust Purifier)
71 Casing
71c Delivering Portion 73 GPF Device (Purification Unit)
100 Motor Vehicle (Vehicle)
103 Dash Panel (Partition Wall)
103a Ceiling Surface
103b Inclined Portion
B Brake Unit
R Engine Compartment
T Tunnel Portion

The invention claimed is:

1. A motor vehicle on which a vehicle engine is mounted, the vehicle engine comprising:
an exhaust purifier housing a gasoline particulate filter device; and
an EGR passage connected to a portion of the exhaust purifier located downstream of the gasoline particulate filter device, wherein
the vehicle engine is mounted in an engine compartment defined in a front portion of the motor vehicle,
the exhaust purifier is connected to a cylinder head of the vehicle engine via an exhaust manifold,
the exhaust manifold includes branch passages, each of which is connected to an associated one of cylinders through an exhaust port of the cylinder head, and a meeting portion at which the branch passages meet together to be connected to the exhaust purifier,
when the branch passages are divided into a portion of the branch passages toward one side in a cylinder bank direction and a portion of the branch passages toward the other side in the cylinder bank direction, the meeting portion is located on the portion of the branch passages toward the one side in the cylinder bank direction,
the meeting portion extends downward from the portion of the branch passages on one side in the cylinder bank direction,
the exhaust purifier is located closer to the portion of the branch passages on the other side in the cylinder bank direction than to a lower end portion of the meeting portion,
an upstream section of the exhaust purifier in an exhaust gas flow direction extends along a vehicle width direction parallel to the cylinder bank direction,
the upstream section of the exhaust purifier which extends along the vehicle width direction is located on a lower side of the branch passages in a vehicle height direction and is arranged to overlap with the branch passages in a longitudinal direction of the motor vehicle orthogonal to the cylinder bank direction when the branch passages are viewed from an upper side of the vehicle height direction,
the exhaust purifier is positioned forward of a partition wall in the longitudinal direction of the vehicle, and extends toward a tunnel portion extending rearward from the partition wall in the longitudinal direction of the motor vehicle, the partition wall defining a rear portion of the engine compartment, and
an upstream end portion of the EGR passage is connected to a lower portion of the exhaust purifier in a vertical direction of the motor vehicle.

2. The motor vehicle of claim 1, wherein
the partition wall has an inclined portion inclined downward toward a rear side in the longitudinal direction of the motor vehicle,
the upstream end portion of the EGR passage is connected to a rear end portion of the exhaust purifier in the longitudinal direction of the motor vehicle, and
the upstream end portion of the EGR passage is positioned below an upper end of the inclined portion in a vehicle height direction when viewed from the side of the motor vehicle.

3. The motor vehicle of claim 1, wherein
the upstream end portion of the EGR passage is positioned to overlap with the tunnel portion when viewed from a front side or rear side of the motor vehicle.

4. The motor vehicle of claim 1, wherein
the exhaust purifier is provided with a delivering portion to which the upstream end portion of the EGR passage is connected, and
the delivering portion projects outward in a vehicle width direction.

5. The motor vehicle of claim 4, wherein
the delivering portion projects opposite in the vehicle width direction to a passage portion of the exhaust purifier positioned upstream from the gasoline particulate filter device, and
the passage portion and the delivering portion both guide gas from one side toward the other side in the vehicle width direction.

6. The motor vehicle of claim 1, wherein
the vehicle engine has a first cylinder, a second cylinder, a third cylinder, and a fourth cylinder arranged next to one another in the cylinder bank direction,
the branch passages include a first branch passage connected to the first cylinder, a second branch passage connected to the second cylinder, a third branch passage connected to the third cylinder, and a fourth branch passage connected to the fourth cylinder,
the meeting portion is arranged to overlap with the first branch passage when the branch passages are viewed from above,
a lower end portion of the meeting portion is open to one side in the vehicle width direction, and
an upstream end of a casing that comprises the exhaust purifier is connected to the lower end portion of the meeting portion.

7. The motor vehicle of claim 6, wherein
the first branch passage extends rearward in the longitudinal direction of the motor vehicle from an outer surface of a cylinder head when the branch passages are viewed from above,
the second branch passage, the third branch passage and the fourth branch passage extend, from the outer surface, along a direction obliquely inclined with respect to the longitudinal direction of the motor vehicle, and
the second branch passage, the third branch passage and the fourth branch passage merge with the first branch passage.

8. The motor vehicle of claim 1, wherein
the exhaust purifier includes a substantially L-shaped casing in which the gasoline particulate filter device is housed, and
the casing is a pipe substantially in the shape of L positioned with its horizontal bar extending in the vehicle width direction and a vertical stem extending from the bar toward a rear side of the motor vehicle.

9. The motor vehicle of claim 8, wherein
the casing includes:
a bar portion corresponding to the horizontal bar of the shape of L and directly connected to a downstream end of the meeting portion; and
a stem portion corresponding to the vertical stem of the shape of L and connected to the bar portion, the bar portion is positioned immediately below the branch passages, the bar portion has one end in the cylinder bank direction, the one end being directly connected to the downstream end of the meeting portion, and the bar portion has the other end opposite to the one end of the bar portion in the cylinder bank direction, the other end being connected to a front end of the stem portion.

* * * * *